UNITED STATES PATENT OFFICE.

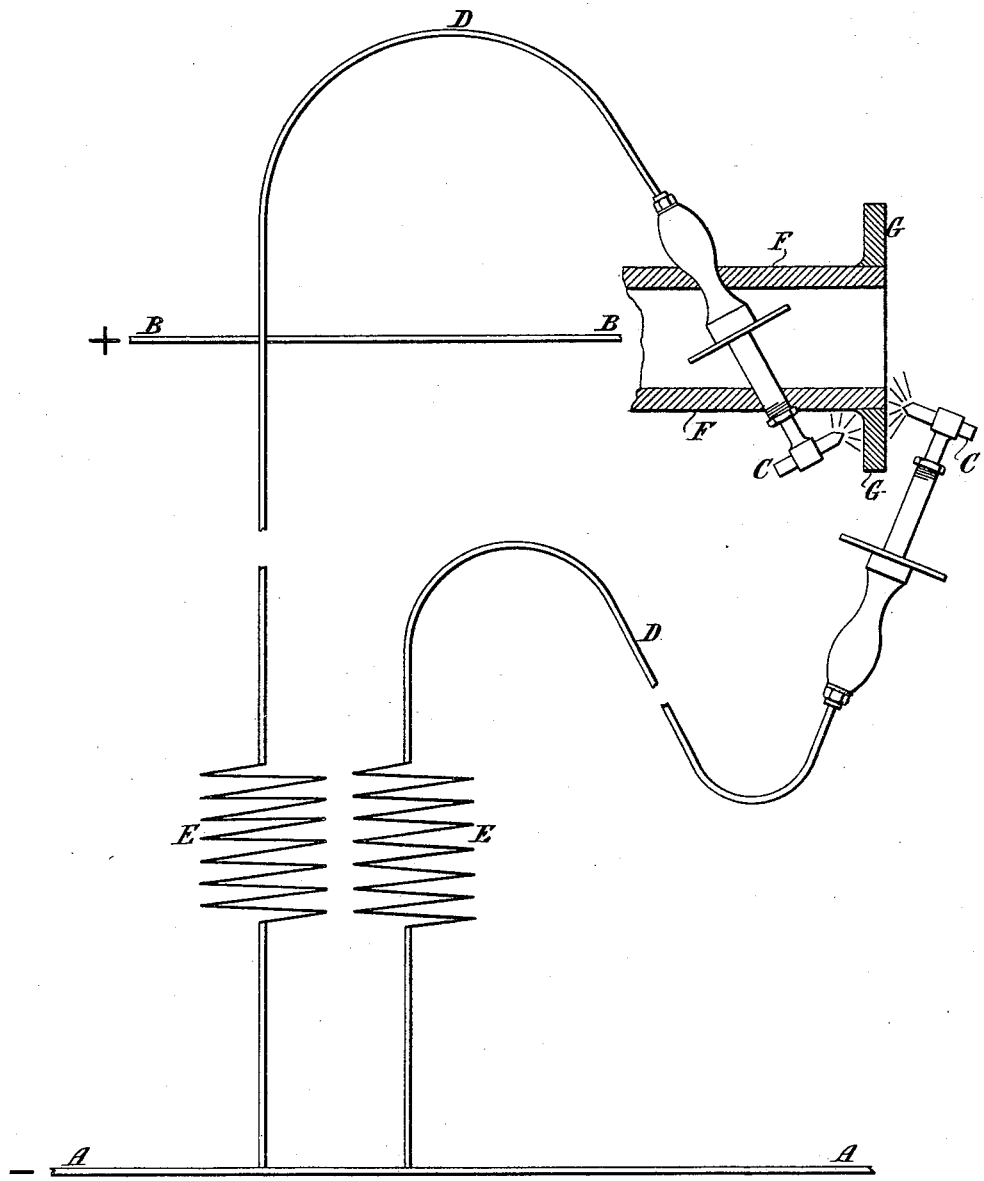

HENRY HOWARD, OF HALESOWEN, NEAR BIRMINGHAM, ENGLAND.

METHOD OF ELECTRIC WELDING.

SPECIFICATION forming part of Letters Patent No. 481,030, dated August 16, 1892.

Application filed May 31, 1892. Serial No. 434,948. (No specimens.)

*To all whom it may concern:*

Be it known that I, HENRY HOWARD, manufacturer, a subject of the Queen of Great Britain, residing at Coombs Wood Tube Works, Halesowen, near Birmingham, England, have invented certain new and useful Improvements in Heating and Welding by Electricity, of which the following is a specification.

This invention relates to heating and welding with the electric arc where the work forms one pole and a pencil the other pole.

In many cases it is necessary or desirable to heat both sides of the work simultaneously or to weld at one heat a joint of considerable length, and it is difficult and often impossible to do this with a single arc. On the other hand, it has heretofore been found impossible to employ two or more arcs simultaneously. According to this invention I do this in the following manner: All of the pencils are connected to one main—say the negative main—from the battery or other source of electricity, while the other main—say the positive main—is connected to the work, and in order to prevent any variation of the current used by one arc from affecting the steadiness of the other arc or arcs I interpose between each pencil and the main a suitable resistance.

The drawing shows a diagrammatic view illustrating the invention.

A is a main connected to the negative pole of the battery or other source of electricity.

B is a main connected to the positive pole.

C C are pencils (usually of carbon) connected by wires D D to the main A, the wires D having in them resistances E E. F is a tube to which the flange G is to be welded. This tube is connected to the main B and is mounted in a lathe (not shown) and caused to revolve with the two arcs playing on the joint.

What I claim is—

In heating and welding with the electric arc, the combination of a main connected to one pole of the source of electricity, two or more pencils connected to the said main, two or more resistances each interposed between one of the pencils and the said main, and a second main connected at one end to the work to be heated or welded and at the other end to the other pole of the source of electricity.

HENRY HOWARD.

Witnesses:
 WALTER MILLAGE,
 3 S. Nicholas St., Worcester.
 W. H. R. LONGHUNT,
*Clerk in Holy Orders, Holdfast, Worcestershire.*